US012603093B2

(12) United States Patent
Han et al.

(10) Patent No.: US 12,603,093 B2
(45) Date of Patent: Apr. 14, 2026

(54) ELECTRONIC APPARATUS AND CONTROLLING METHOD THEREOF

(71) Applicant: SAMSUNG ELECTRONICS CO., LTD., Suwon-si (KR)

(72) Inventors: Sooyeon Han, Suwon-si (KR); Kihyoung Son, Suwon-si (KR); Soyoung Jung, Suwon-si (KR); Youngah Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 259 days.

(21) Appl. No.: 18/244,714

(22) Filed: Sep. 11, 2023

(65) Prior Publication Data

US 2024/0161752 A1     May 16, 2024

Related U.S. Application Data

(63) Continuation of application No. PCT/KR2023/009684, filed on Jul. 7, 2023.

(30) Foreign Application Priority Data

Nov. 11, 2022     (KR) ......................... 10-2022-0150957

(51) Int. Cl.
 *G10L 15/32*          (2013.01)
 *G06F 3/16*           (2006.01)
                      (Continued)

(52) U.S. Cl.
 CPC .............. *G10L 15/32* (2013.01); *G06F 3/167* (2013.01); *G10L 15/08* (2013.01); *G10L 15/22* (2013.01);
                      (Continued)

(58) Field of Classification Search
 USPC ....................................................... 704/1–504
 See application file for complete search history.

(56) References Cited

U.S. PATENT DOCUMENTS 9,318,108 B2 *   4/2016   Gruber ................... B60K 35/00
9,620,104 B2 *   4/2017   Naik ..................... G10L 13/027
                      (Continued)

FOREIGN PATENT DOCUMENTS

CN          111954868 A      11/2020
JP          2021-4950 A       1/2021
                      (Continued)

OTHER PUBLICATIONS

International Search Report (PCT/ISA/210) issued Oct. 20, 2023 by the International Searching Authority in International Patent Application No. PCT/KR2023/009684.
                      (Continued)

*Primary Examiner* — Marcus T Riley
(74) *Attorney, Agent, or Firm* — Sughrue Mion, PLLC

(57)          ABSTRACT

An electronic apparatus includes: a display; a memory configured to store a plurality of assistance instructions respectively corresponding to a plurality of voice assistants; and at least one processor operatively connected to the display and the memory, wherein the at least one processor is configured to, based on a user voice command, generate response information by using the at least one voice assistant and control the display to display the generated response information, based on a predetermined voice command received during a first voice assistant operation, activate a second voice assistant operation corresponding to the predetermined voice command.

17 Claims, 12 Drawing Sheets

(51) Int. Cl.
    *G10L 15/08*           (2006.01)
    *G10L 15/22*           (2006.01)

(52) U.S. Cl.
    CPC .. *G10L 2015/088* (2013.01); *G10L 2015/223*
                  (2013.01); *G10L 2015/228* (2013.01)

(56)             References Cited

U.S. PATENT DOCUMENTS

| | | | | |
|---|---|---|---|---|
| 9,633,674 | B2 * | 4/2017 | Sinha | G10L 15/22 |
| 9,966,060 | B2 * | 5/2018 | Naik | G10L 13/08 |
| 9,966,068 | B2 * | 5/2018 | Cash | H04W 4/029 |
| 10,176,167 | B2 * | 1/2019 | Evermann | G06F 40/35 |
| 10,185,542 | B2 * | 1/2019 | Carson | G06F 3/04842 |
| 10,235,997 | B2 * | 3/2019 | Shah | H04N 21/4104 |
| 10,283,116 | B2 * | 5/2019 | Ko | G10L 15/22 |
| 10,553,209 | B2 * | 2/2020 | Gruber | G10L 15/22 |
| 10,586,540 | B1 * | 3/2020 | Smith | G06F 3/165 |
| 10,657,961 | B2 * | 5/2020 | Cash | G06F 16/9537 |
| 10,902,851 | B2 * | 1/2021 | Kline | G06F 3/167 |
| 11,189,279 | B2 * | 11/2021 | Trufinescu | G06F 9/453 |
| 11,302,319 | B2 * | 4/2022 | Jang | G10L 15/30 |
| 11,393,474 | B2 * | 7/2022 | Lee | G10L 15/1822 |
| 11,445,301 | B2 * | 9/2022 | Park | G06F 3/167 |
| 11,501,773 | B2 * | 11/2022 | Smith | G06F 3/165 |
| 12,027,164 | B2 * | 7/2024 | Barros | G10L 15/1822 |
| 12,076,108 | B1 * | 9/2024 | Nudd | G06N 20/00 |
| 2014/0111689 | A1 * | 4/2014 | Kim | H04N 5/44504 |
| | | | | 348/563 |
| 2017/0206896 | A1 * | 7/2017 | Ko | G06F 3/16 |
| 2018/0025725 | A1 * | 1/2018 | Qian | G10L 15/22 |
| | | | | 704/257 |
| 2020/0111490 | A1 * | 4/2020 | Jang | G10L 15/22 |
| 2020/0152187 | A1 * | 5/2020 | Kline | H04L 12/1895 |
| 2020/0395013 | A1 * | 12/2020 | Smith | G06F 3/167 |
| 2021/0043205 | A1 * | 2/2021 | Lee | G10L 15/30 |
| 2021/0074299 | A1 * | 3/2021 | Hwang | G06F 16/90332 |
| 2021/0304743 | A1 * | 9/2021 | Gross | H04M 1/72412 |
| 2022/0270605 | A1 * | 8/2022 | Jang | G10L 15/30 |
| 2022/0270608 | A1 * | 8/2022 | Kang | G06F 3/167 |
| 2022/0301549 | A1 * | 9/2022 | Lee | G10L 15/08 |
| 2023/0215435 | A1 * | 7/2023 | Manjunath | G10L 15/22 |
| 2023/0274738 | A1 * | 8/2023 | Smith | G06F 3/165 |
| | | | | 704/251 |
| 2024/0161752 | A1 * | 5/2024 | Han | G10L 15/08 |

FOREIGN PATENT DOCUMENTS

| | | | |
|---|---|---|---|
| JP | 2022-536765 | A | 8/2022 |
| KR | 10-2014-0052155 | A | 5/2014 |
| KR | 10-1577493 | B1 | 12/2015 |
| KR | 10-2017-0086814 | A | 7/2017 |
| KR | 10-2021-0016815 | A | 2/2021 |
| KR | 10-2021-0094251 | A | 7/2021 |
| KR | 10-2307976 | B1 | 9/2021 |
| KR | 10-2394278 | B1 | 5/2022 |
| KR | 10-2022-0123932 | A | 9/2022 |
| KR | 10-2023-0110788 | A | 7/2023 |

OTHER PUBLICATIONS

Written Opinion (PCT/ISA/237) issued Oct. 20, 2023 by the International Searching Authority in International Patent Application No. PCT/KR2023/009684.

\* cited by examiner

"CALL BIXBY"

620

CONVERTING

630

IT'S BIXBY.

910

1010

"Hey TV, can you turn down the air conditioner?"

Start Bixby

Samsung Air conditioner

Weak

ELECTRONIC APPARATUS AND CONTROLLING METHOD THEREOF

CROSS-REFERENCE TO RELATED APPLICATIONS

This application is a by-pass continuation application of International Application No. PCT/KR2023/009684, filed on Jul. 7, 2023, which is based on and claims priority to Korean Patent Application No. 10-2022-0150957, filed on Nov. 11, 2022, in the Korean Intellectual Property Office, the disclosures of which are incorporated by reference herein their entireties.

BACKGROUND

1. Field

This disclosure relates to an electronic apparatus and a controlling method thereof and, more particularly, an electronic apparatus capable of using a plurality of voice assistance functions or a plurality of voice assistants by switching or integrating them and a controlling method thereof.

2. Description of Related Art

Recent electronic apparatuses provide assistance functions. Here, an assistance function refers to a function that helps a user to perform a desired function using an artificial intelligence technology even if the user does not provide an exact instruction.

Such assistance function is applied to various fields such as content playback, content search, schedule management, and information search, etc.

SUMMARY

According to an aspect of the disclosure, an electronic apparatus includes: a display; a memory configured to store a plurality of assistance instructions respectively corresponding to a plurality of voice assistants; and at least one processor operatively connected to the display and the memory, wherein the at least one processor is configured to, based on a user voice command, generate response information by using the at least one voice assistant and control the display to display the generated response information, based on a predetermined voice command received during a first voice assistant operation, activate a second voice assistant operation corresponding to the predetermined voice command.

According to another aspect of the disclosure, a controlling method of an electronic apparatus, includes: receiving a user voice command; based on the user voice command, generating response information by using at least one voice assistant of a plurality of voice assistants; displaying the generated response information; and based on a predetermined voice command being input during a first voice assistant operation, activating a second voice assistant operation corresponding to the predetermined voice command.

According to another aspect of the disclosure, a method performed by an integration engine communicating with a display device having a plurality of voice assistants, includes: transferring, to the display device, a first command to activate a first voice assistant of the plurality of voice assistants; receiving, from the display device, a first request to determine a new voice assistant to be used by the display device; determining the new voice assistant to be used by the display device; and transferring, to the display device, a second command to inform the determined new voice assistant.

BRIEF DESCRIPTION OF THE DRAWINGS

The above-described or other aspects, features and advantages of the embodiments will become more apparent from the following description with reference to the accompanying drawings. In the attached drawings:

FIG. 2 illustrates a configuration of an electronic apparatus according to one or more embodiments;

FIG. 3 illustrates a configuration of an electronic apparatus according to one or more embodiments;

FIG. 5 illustrates an operation of an electronic apparatus according to one or more embodiments;

DETAILED DESCRIPTION

Figure 1:
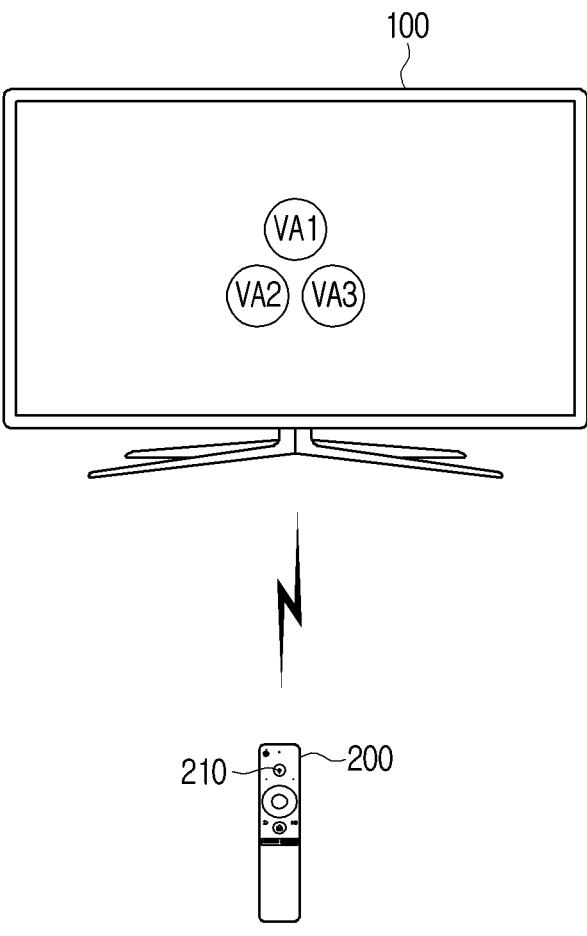
FIG. 1 illustrates an electronic apparatus according to one or more embodiments.

Since the disclosure may be variously modified and have several exemplary embodiments, specific exemplary embodiments of the disclosure will be illustrated in the drawings and be described in detail in the detailed description. However, it is to be understood that the disclosure are not limited to specific exemplary embodiments, but include all modifications, equivalents, and substitutions according to exemplary embodiments of the disclosure. Throughout the accompanying drawings, similar components will be denoted by similar reference numerals.

In describing the disclosure, when it is decided that a detailed description for the known functions or configurations related to the disclosure may unnecessarily obscure the gist of the disclosure, the detailed description therefor will be omitted.

In addition, the following exemplary embodiments may be modified in several different forms, and the scope and spirit of the disclosure are not limited to the following exemplary embodiments. Rather, these exemplary embodiments make the disclosure thorough and complete, and are provided to completely transfer the spirit of the disclosure to those skilled in the art.

Terms used in the disclosure are used only to describe specific exemplary embodiments rather than limiting the scope of the disclosure. Singular forms are intended to include plural forms unless the context clearly indicates otherwise.

In the disclosure, an expression "have," "may have," "include," "may include," or the like, indicates existence of a corresponding feature (for example, a numerical value, a function, an operation, a component such as a part, or the like), and does not exclude existence of an additional feature.

In the disclosure, an expression "A or B," at least one of "A or/and B," "one or more of A or/B," or the like, may include all possible combinations of items enumerated together. For example, "A or B," "at least one of A and B," or "at least one of A or B" may indicate all of 1) a case in which at least one A is included, 2) a case in which at least one B is included, or 3) a case in which both of at least one A and at least one B are included.

Expressions "first", "second", "$1^{st}$", "$2^{nd}$", or the like, used in the disclosure may indicate various components regardless of a sequence and/or importance of the components, will be used only in order to distinguish one component from the other components, and do not limit the corresponding components.

When it is mentioned that any component (for example: a first component) is (operatively or communicatively) coupled with/to or is connected to another component (for example: a second component), it is to be understood that any component is directly coupled to another component or may be coupled to another component through the other component (for example: a third component).

On the other hand, when it is mentioned that any component (for example, a first component) is "directly coupled" or "directly connected" to another component (for example, a second component), it is to be understood that the other component (for example, a third component) is not present between any component and another component.

An expression "~configured (or set) to" used in the disclosure may be replaced by an expression "suitable for," "having the capacity to," "~designed to," "~adapted to," "~made to," or "~capable of" depending on a situation. A term "~configured (or set) to" may not necessarily mean "specifically designed to" in hardware.

Instead, an expression "~an apparatus configured to" may mean that the apparatus "is capable of" together with other apparatuses or components. For example, a "processor configured (or set) to perform A, B, and C" may mean a dedicated processor (for example, an embedded processor) for performing the corresponding operations or a generic-purpose processor (for example, a central processing unit (CPU) or an application processor) that may perform corresponding operations by executing one or more software programs stored in a memory apparatus.

In exemplary embodiments, a "module" or a "unit" may perform at least one function or operation, and be implemented by hardware or software or be implemented by a combination of hardware and software. In addition, a plurality of "modules" or a plurality of "units" may be integrated in at least one module and be implemented by at least one processor except for a 'module' or a 'unit' that needs to be implemented by specific hardware.

Operations performed by the modules, the programs, or the other components according to the diverse embodiments may be executed in a sequential manner, a parallel manner, an iterative manner, or a heuristic manner, or at least some of the operations may be performed in a different order or be omitted, or other operations may be added.

Various components and areas in the drawings are schematically drawn. Therefore, the technical spirit of the present disclosure is not limited by the relative size or spacing drawn in the accompanying drawings.

The electronic apparatus according to one or more embodiments may include at least one of smartphones, tablet personal computers (PCs), desktop PCs, laptop PCs, or wearable devices. Here, the wearable device may include at least one of an accessory type of a device (e.g., a timepiece, a ring, a bracelet, an anklet, a necklace, glasses, a contact lens, or a head-mounted-device (HMD)), one-piece fabric or clothes type of a circuit (e.g., electronic clothes), a body-attached type of a circuit (e.g., a skin pad or a tattoo), or a bio-implantable type of a circuit.

According to some embodiments, the electronic apparatus may include at least one of refrigerators, air-conditioners, cleaners, ovens, microwave ovens, washing machines, air cleaners, set-top boxes, home automation control panels, security control panels, media boxes (e.g., Samsung Home-Sync™, Apple TV™, or Google TV™), game consoles (e.g., Xbox™ or PlayStation™), electronic dictionaries, electronic keys, camcorders, electronic picture frames, or the like. In addition to the above-described embodiments, an electronic apparatus according to the present disclosure may be any apparatus as long as it includes a display.

Hereinafter, an embodiment according to the present disclosure will be described in detail with reference to the accompanying drawings so that those skilled in the art can easily implement it.

FIG. 1 illustrates an electronic apparatus according to one or more embodiments.

Referring to FIG. 1, an electronic apparatus 100 performs a voice assistant function. Here, the voice assistant function is a function that uses an AI technology to help a user perform a desired function even if the user does not input a voice command accurately. Such an assistance function is being applied to various fields such as content reproduction, schedule management, information search, and the like.

For example, in the case of wanting to listen to music, a user had to designate the music he or she wanted to hear accurately. However, if the assistance function is used, music corresponding to the user's taste may be automatically selected and played.

Recent electronic apparatuses may be equipped with a plurality of voice assistants instead of one voice assistant. For example, various voices assistances such as a voice assistant (VA1) provided by a manufacturer, a voice assistant (VA2) provided by an OS platform, a voice assistant (VA3) provided by a specific application, etc. may be installed.

As such, when a plurality of voice assistants are installed, the user has difficulty in selecting the plurality of voice assistants. For example, the user had to directly press a button corresponding to the voice assistant to be used or select an utterance trigger indicating the corresponding voice assistant.

In order to change a voice assistant in a situation where the executed voice assistant is not the voice assistant intended by the user, the currently executed voice assistant must be terminated and the intended voice assistant must be selected and activated, which causes inconvenience.

In addition, in the prior art, only response information (or response contents) of one voice assistant could be obtained in response to a user voice command. However, since each voice assistant has advantages and disadvantages, a method for integrating and using a plurality of voice assistants has been required.

Accordingly, the electronic apparatus 100 according to the present disclosure capable of using a plurality of assistance functions by easily switching or integrating them.

For example, when a user activates a voice assistant function by pressing a voice assistant button 210, a voice assistant to be used is determined based on the user's uttered command, the current user, the currently executed application, and the like, a voice command can be processed using the determined voice assistant.

In addition, the electronic apparatus 100 according to the present disclosure may switch to another voice assistant only with the user's uttered command while using a specific voice assistant.

Further, the electronic apparatus 100 according to the present disclosure may provide response information corresponding to a voice command using response information of a plurality of voice assistants rather than a result of once voice assistant.

Detailed functions of the integrated voice assistant will be described in greater detail with reference to FIGS. 4 to 10. Further, specific configuration and operation of the electronic apparatus 100 will be described with reference to FIGS. 2 and 3.

As described above, the electronic apparatus 100 according to the present disclosure integrates and manages (or processes) a plurality of voice assistants, and the user can easily select/switch voice assistants and can be provided with various and more accurate information through a single voice command.

FIG. 1 illustrates that a user voice is input through a remote controller 200, but in the implementation, it is possible not only to receive a user voice directly from the electronic apparatus 100 but also to receive a voice command through a user terminal device (e.g., smartphone, tablet, etc.) other than the remote controller 200.

In addition, FIG. 1 describes the feature of processing a voice command only for the voice assistant selected or determined by a user, but in the implementation, all installed voice assistants may process a user voice command, and only the activated (or selected) voice assistant may display (or perform) the result.

In other words, being activated in the present disclosure means not only being in a state where a user's uttered command is received and can be processed but also being in a state where a response result processed according to a voice command can be displayed (or executed).

Figure 2:
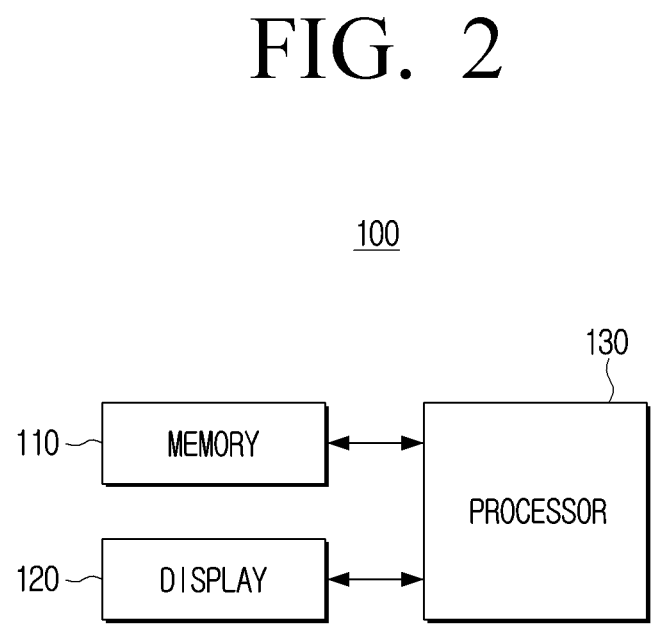

FIG. 2 illustrates a configuration of an electronic apparatus according to one or more embodiments.

Referring to FIG. 2, the electronic apparatus 100 may include a memory 110, a display 120 and a processor 130.

The memory 110 may store data necessary for one or more embodiments of the disclosure. The memory 110 may be implemented in the form of a memory embedded in the electronic apparatus 100, or may be implemented in the form of a memory that can communicate with (detachable from) the electronic apparatus 100, based on a data storing purpose.

For example, data for driving the electronic apparatus 100 may be stored in the memory embedded in the electronic apparatus 100, and data for an extension function of the electronic apparatus 100 may be stored in the memory that can communicate with the electronic apparatus 100. The memory embedded in the electronic apparatus 100 may be implemented as at least one of a volatile memory (for example, a dynamic random access memory (DRAM), a static RAM (SRAM), or a synchronous dynamic RAM (SDRAM)), a non-volatile memory (for example, an one time programmable read only memory (OTPROM), a programmable ROM (PROM), an erasable and programmable ROM (EPROM), an electrically erasable and programmable ROM (EEPROM), a mask ROM, or a flash ROM), a flash memory (for example, a NAND flash or a NOR flash), a hard drive, or a solid state drive (SSD)). In addition, the memory that can communicate with the electronic apparatus 100 may be implemented in the form of a memory card (for example, a compact flash (CF), a secure digital (SD), a micro secure digital (Micro-SD), a mini secure digital (Mini-SD), an extreme digital (xD), or a multimedia card (MMC)), or an external memory which may be connected to a universal serial bus (USB) port (for example, a USB memory).

According to one or more embodiments, the memory 110 may store at least one instruction or a computer program including instructions for controlling the electronic apparatus 100. Such a computer program may be a plurality of assistance programs (or assistance instructions) corresponding to each of a plurality of voice assistants, an integrated engine program for integrated management of a plurality of voice assistants, an application program installed in the electronic apparatus 100, and the like.

According to other embodiments, the memory 110 may store information regarding an artificial intelligence model including a plurality of layers. Here, storing an artificial intelligence model may mean storing various information related to an operation of an artificial intelligence model, for example, information regarding a plurality of layers included in an artificial intelligence model, information regarding a parameter (e.g., filter coefficients, bias, etc.) used in each of a plurality of layers, and the like. For example, such an artificial intelligence model may be a model for voice recognition or a model for an assistance function.

The memory 110 may store information regarding a voice assistant corresponding to a user, an application, and the like or history information related to use of the voice assistant. For example, the memory 110 may store history information indicating that a specific user uses a first voice assistant or history information indicating that a second voice assistant is used while a specific application is executed, and the like.

The display 120 may receive a signal from the processor 130, and display information regarding the received signal. For example, the display 120 may be implemented as a display including a self-light emitting element or a display including a non self-light emitting element and a backlight.

For example, the display 120 may be implemented in various types of displays such as a liquid crystal display (LCD), an organic light emitting diode (OLED) display, a light emitting diode (LED) display, a micro light emitting diode (micro LED) display, a mini LED display, a plasma display panel (PDP), a quantum dot (QD) display, a quantum dot light-emitting diode (QLED) display, a projector, and the like. The display 120 may also include a driving circuit, a backlight unit, or the like, which may be implemented in a form such as an a-si thin film transistor (TFT), a low temperature poly silicon (LTPS) TFT, or an organic TFT (OTFT).

The display 120 may be implemented as a touch screen combined with a touch sensor, a flexible display, a rollable display, a three-dimensional (3D) display, a display in which a plurality of display modules are physically connected with each other, or the like.

The display 120 may display a screen corresponding to an executed application. In addition, when a plurality of applications is running, the display 120 may display a plurality of screens corresponding to each of the plurality of applications together.

The display 120 may display a UI screen according to a voice assistant operation, or display the above-described UI screen together with an executed application. The above-described UI screen may display an operation state of a voice assistant or information regarding a voice assistant that is currently operating (or activated), or may display a response result that is a voice recognition result. Examples of various UI screens that can be displayed on the display 120 will be described later with reference to FIGS. 6 to 10.

The processor 130 controls a configuration of the electronic apparatus 100. Such a processor 130 may also be referred to as a controller, a control device, etc.

The processor 130 may consist of one or a plurality of processors. Specifically, the processor 130 may perform an operation of the electronic apparatus 100 according to one or more embodiments by executing at least one instruction stored in a memory.

According to one or more embodiments, the processor 130 may be implemented as a digital signal processor (DSP) processing a digital video signal, a microprocessor, a graphics processing unit (GPU), an artificial intelligence (AI) processor, or a neural processing unit (NPU), or a timing controller (T-CON). However, the disclosure is not limited thereto, and the processor 130 may include at least one of a central processing unit (CPU), a micro controller unit (MCU), a micro processing unit (MPU), a controller, an application processor (AP), a communication processor (CP), or an advanced RISC machine (ARM) processor, or may be defined by this term. In addition, the processor 130 may be implemented in a system-on-chip (SoC) or a large scale integration (LSI) in which a processing algorithm is embedded, or may be implemented in the form of an application specific integrated circuit (ASIC) or a field programmable gate array (FPGA).

In addition, the processor 130 for executing an integrated voice assistant function according to one or more embodiments may be implemented as a general-purpose processor such as CPU, AP, Digital Signal Processor (DSP), etc., a graphic-only processor such as GPU and Vision Processing Unit (VPU), or a combination of an AI-only processor such as NPU and software.

The processor 130 may control input data according to predefined operation rules or artificial intelligence models stored in the memory 110. Alternatively, if the processor 130 is a dedicated processor (or an AI-only processor), it may be designed as a hardware structure specialized for processing a specific artificial intelligence model. For example, hardware specialized for processing a specific artificial intelligence model may be designed as a hardware chip such as ASIC, FPGA, etc. When the processor 130 is implemented as a dedicated processor, it may be implemented to include a memory for implementing an embodiment of the present disclosure or to include a memory processing function for using an external memory.

When a user command is input, the processor 130 may perform a function corresponding to the user command. For example, when a content playback command is input, the processor 130 may control the display 120 to display an image corresponding to the content selected by the user. Such a user command may be input through a button provided in the electronic apparatus 100 or through an external device.

When there are a plurality of currently running applications, the processor 130 may be controlled so that a plurality of applications (corresponding to each of the plurality of applications) is displayed together. In other words, the electronic apparatus 100 may support multi-view.

When a voice assistant call event occurs, the processor 130 may determine a voice assistant to process a user's uttered voice. Here, the voice assistant call event may be input through an external device (e.g., a remote controller 200, a user terminal device 300, etc.), and it may be input through a button provided in the electronic apparatus 100 or may be a case where a user utters a keyword (e.g., "Hi, Bixby") calling a specific voice assistant.

Specifically, when a voice assistant call event occurs, the processor 130 may determine at least one voice assistant based on at least one of a user's uttered keyword, a user account, a currently running application, or voice assistant history information.

For example, when a user generates a voice assistant call event by specifying a specific voice assistant, the user may determine the specific voice assistant as a voice assistant to be used. In other words, when a user inputs a voice command including a specific keyword (e.g., "Bixby, please recommend a movie", wherein "Bixby" is the call name (or keyword) of the voice assistant), a voice assistant corresponding to the keyword may be determined as a voice assistant to be used. Alternatively, even when a voice assistant is called by pressing a button for calling a specific assistance on a remote controller (or a user terminal device), a voice assistant corresponding to the button may be determined as a voice assistant to be used as described above.

If the user does not specify a voice assistant, the processor 130 may specify the user currently using the electronic apparatus 100, identify the current user and the currently running application, and determine a voice assistant corresponding to the current user and the current application using pre-stored history information.

If it is difficult to specify the user, for example, if a voice command is input through a remote controller, the processor 130 may check history information and determine a voice assistant corresponding to the currently running application as a voice assistant to be used. In this case, if a plurality of applications are currently running and the voice assistant corresponding to each of the plurality of applications is different, the plurality of voice assistants may be determined as the voice assistants to be used.

On the other hand, if it is possible to specify the user but there is no currently running application, the processor 130 may determine a voice assistant corresponding to most frequently used by the corresponding user based on the user's history information.

In the process of determining a voice assistant, the processor 130 may determine that a plurality of voice assistants rather than one voice assistant are used. For example, when a voice command is input, the processor 130 may check the user voice command using a first voice assistant, when the checked user voice command is a voice command that can be processed in another second voice assistant, activate the second assistance, and determine that response information is generated using each of the first voice assistant and the second voice assistant.

The operation of determining the voice assistant to be used may be implemented in various ways. For example, a voice assistant that performs voice recognition on a user's uttered voice may be determined, or a voice assistant that provides a response result according to the recognition result may be determined.

In other words, in implementation, when a voice assistant call event occurs, only the voice assistant determined in the above manner may process the input user voice data, or all installed voice assistants may process the input user voice data and only the voice assistant previously determined in the process of providing a corresponding response result may provide the response result.

In addition, processing voice data using a plurality of assistances may be implemented in various ways. For example, the processor 130 may be configured not only that all processes such as voice recognition using voice data input by each of a plurality of voice assistants, confirming a user request and generating a response result according to a request are performed but also that a single voice assistant performs only voice recognition and another voice assistant receives and operates text information according to the voice recognition result.

As such, when the voice assistant to be used is determined, the processor 130 may process a user voice command using the determined voice assistant. Specifically, the processor 130 may convert a user's uttered voice into a text using a voice recognition engine, confirm the user's intent and/or an object using the converted text, confirm a user command, and generate response information corresponding to the confirmed user command. In this case, the processor 130 may control the display 120 so that the voice recognition result corresponding to the user's uttered voice is displayed.

In one embodiment, the processor 130 may perform the above-described operation by the electronic apparatus 100 itself or may obtain response information according to a voice recognition result using an external server.

When response information using a voice assistant is generated through the above-described process, the processor 130 may control the display 120 to display the response information. In this case, when a plurality of response information is generated by the operation of a plurality of applications, the processor 130 may display a UI screen including response information regarding each of the plurality of voice applications. Alternatively, the processor 130 may select only common response information from among the plurality of response information and display a UI screen including only the selected response information.

When a user voice command is input while a plurality of screens are displayed by the operation of a plurality of applications, the processor 130 may control the display 120 to display response information of the voice assistant corresponding to each of the plurality of applications on an area corresponding to the screen of the plurality of applications.

When a predetermined voice command is input during the operation of the first voice assistant, the processor 130 may activate the operation of the second voice assistant corresponding to the predetermined voice command. For example, when a voice command is input, the processor 130 may check the user voice command using the first voice assistant, when the checked user voice command is a command for calling the second voice assistant, may activate the second voice assistant, and when the second voice assistant is activated, may process the input voice command using the second voice assistant. In other words, the subject to process the voice command may be switched to the second voice assistant.

In one embodiment, when all of a plurality of voice applications perform a voice recognition operation and a selected voice application provides response information, the above-described conversion may be to switch the voice application that provides response information.

When the checked user voice command is a command for calling the first voice assistant, the processor 130 may control the display 120 to display a UI screen informing that the voice assistant is changed.

Although FIG. 2 briefly illustrates the configuration of the electronic apparatus 100, the electronic apparatus 100 may further include various configurations.

Figure 3:
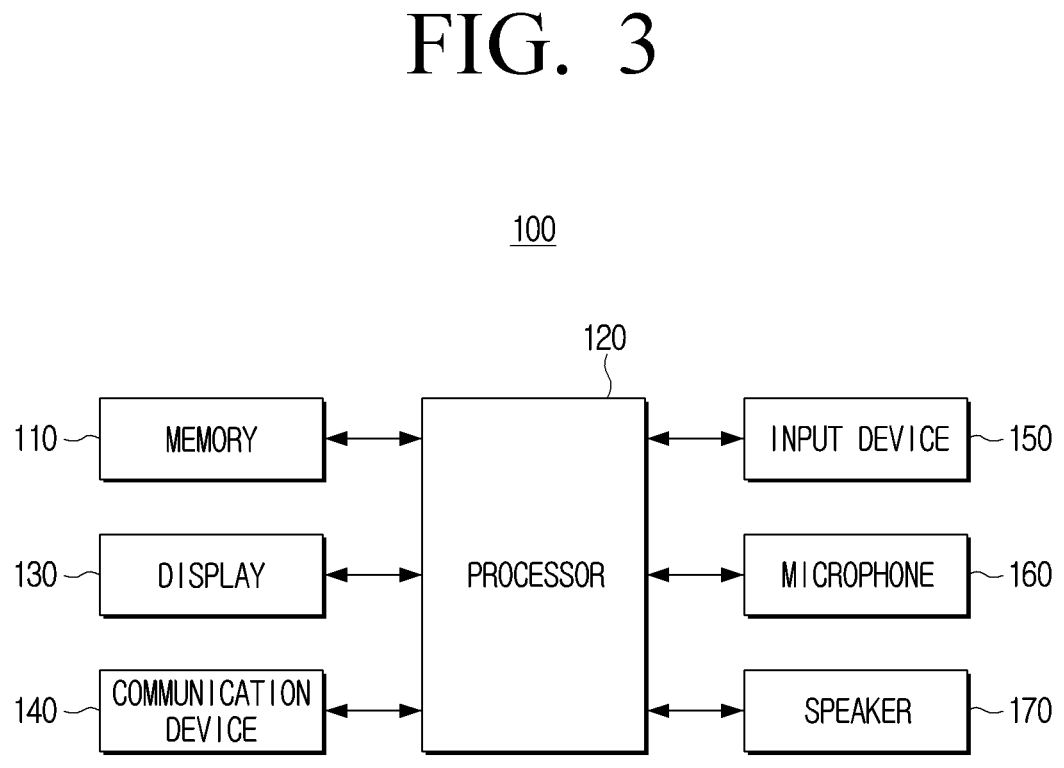

FIG. 3 illustrates a configuration of an electronic apparatus according to one or more embodiments.

Referring to FIG. 3, an electronic apparatus 100' may include a memory 110, a display 120, a processor 130, a communication device 140, an input device 150, a microphone 160, and a speaker 170.

Since the operation of the memory 110, the display 120 and the processor 130 has been described above with reference to FIG. 2, only other operations not described in FIG. 2 will be described.

The communication device 140 includes at least one circuit, and may perform communication with various types of external devices. Such a communication device 140 may be implemented as various interfaces according to one or more embodiments. For example, the communication device 140 may include at least one interface among various types of digital interfaces, AP-based Wi-Fi (Wireless LAN Network), Bluetooth, Zigbee, wired/wireless Local Area Network (LAN), Wide Area Network (WAN), Ethernet, Near Field Communication (NFC), and IEEE1394.

In addition, the communication device 140 may include at least one interface among High Definition Multimedia Interface (HDMI), Mobile High-Definition Link (MHL), Universal Serial Bus (USB), Display Port (DP), Thunderbolt, Video Graphics Array (VGA) port, RGB port, D-Subminiature (D-SUB), Digital Visual Interface (DVI), Audio Engineering Society/European Broadcasting Union (AES/EBU), Optical, and Coaxial.

The communication device 140 receives a content. Here, the content may be a content having sound source data such as a music content, a video content, and the like, or a content not including sound source data (e.g., photos, texts, e-books, etc.).

The communication device 140 may communicate with an external server, and transmit/receive various data for performing an assistance function. For example, the communication device 140 may transmit an audio signal corresponding to a user's uttered voice or text information obtained by converting the corresponding audio signal into a text to an external server. In addition, the communication device 140 may receive a response content corresponding to the transmitted information. For example, when a user utters a voice such as "please play music A", the communication device 140 may receive a content corresponding to music A.

In one embodiment, when such an operation is performed, the external server that transmits the above-described uttered voice or text may be different from the external server that provides the corresponding response content. In other words, the external server that transmits the above-described uttered voice or text may be a server that performs a voice recognition function, and the external server that provides the content may be a content providing server.

As such, when different external servers operate in conjunction with each other, the electronic apparatus 100 may receive a content directly from a content providing server without separate intervention, receive a response message from the server that performs a voice recognition function and receive a content by providing a request message corresponding to the received response message to the content providing server. For example, the external server that performs voice recognition may generate a response message indicating that music content A is reproduced and provide the response message to the electronic apparatus 100. In this case, the electronic apparatus 100 may request and receive music content A from the content providing server. Alternatively, the external server that performs voice recognition may directly transmit a command to provide music content A to the content providing server to the electronic apparatus 100 to the content providing server. In this case, the electronic apparatus 100 may directly receive music content A.

In addition, the communication device 140 may transmit information request for performing a command corresponding to a voice recognition result. For example, when a user requests today's weather, the electronic apparatus 100 may recognize that todays' weather information needs to be output and request and receive information regarding today's weather from an external server.

In addition, the communication device 140 may transmit a command corresponding to a voice recognition result to another device. For example, when a user voice command is a command to control another device (e.g., "please lower the temperature of the air conditioner"), the communication device 140 may transmit a control command corresponding to the user command to another device.

Further, the communication device 140 may receive a voice command (specifically, sound source data, voice data including a user utterance) from another device. Specifically, when a user's uttered command is input through a remote controller or a user terminal device rather than the electronic apparatus 100, user voice data may be received from the corresponding device.

In this case, when receiving the above-described user voice data from a user terminal device, the communication device 140 may also receive user information of the user terminal device or voice assistant identification information. Here, when the user determines a voice assistant in the user terminal device, the voice assistant identification information may be identification information indicating the determined voice assistant.

The input device 150 may be implemented as a device for receiving a user's control command. Alternatively, the input device 150 may be implemented as a touch screen that also performs the function of the display 120.

The microphone 160 is configured to receive a user voice or other sounds and convert them into audio data. The processor 130 may perform a voice assistant function using a user voice input through the microphone 160. In addition, the microphone 160 may be implemented as a stereo microphone that receives sound input from a plurality of locations.

The speaker 170 outputs a sound corresponding to a content. In addition, the speaker 170 may output various guide messages or response information corresponding to received response messages as a sound. Such a speaker 170 may consist of a plurality of speaker units.

When receiving voice data from an external device (e.g., when receiving voice data from a user terminal device 300), if user information or voice assistant information included in the voice data is received together, the processor 130 may determine a voice assistant to be used using the corresponding information.

Figure 4:
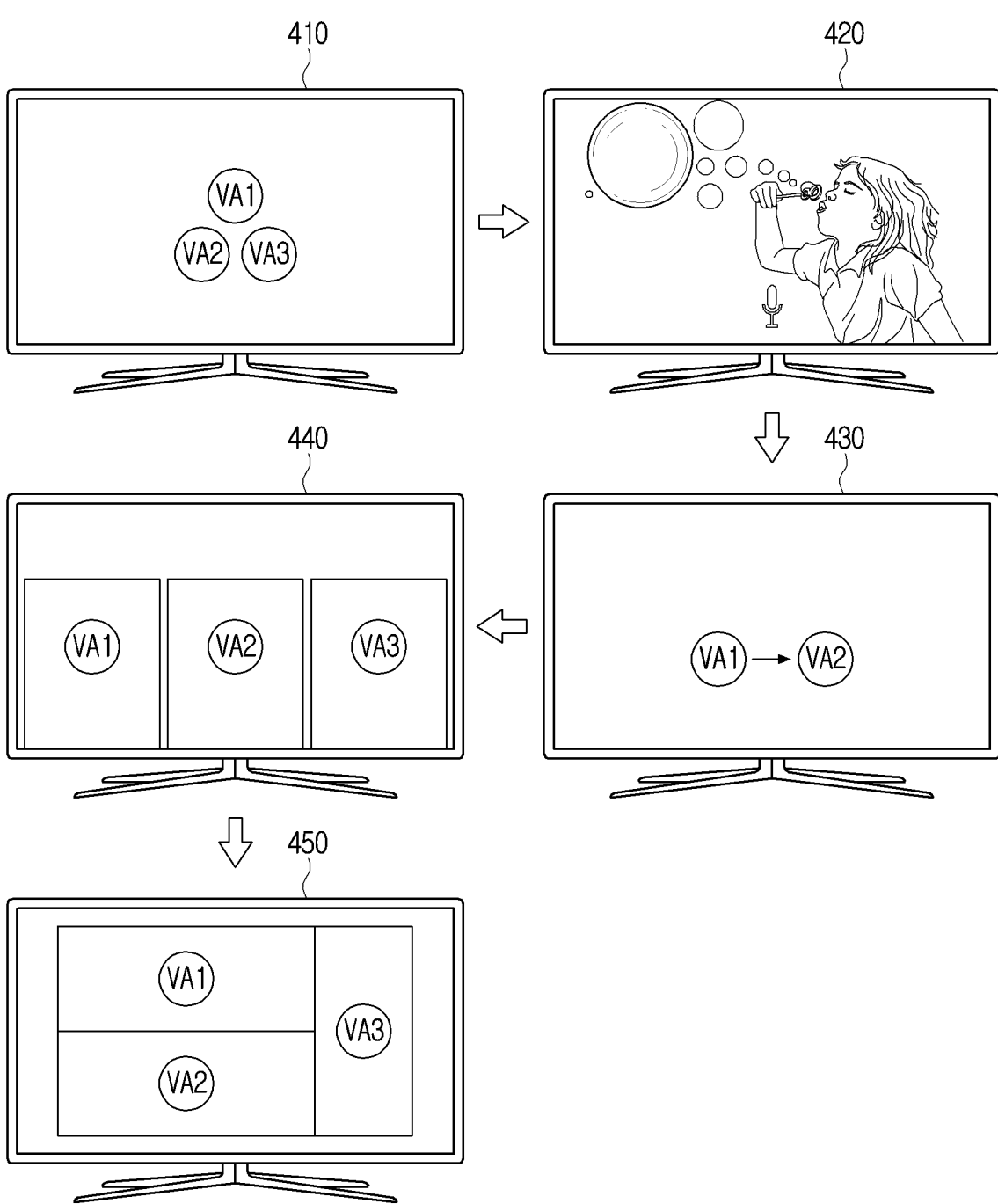
FIG. 4 illustrates an operation of an electronic apparatus according to one or more embodiments.

FIG. 4 illustrates an operation of an electronic apparatus according to one or more embodiments.

FIG. 4 illustrates various operational examples of an integrated voice assistant function according to the present disclosure. The examples illustrate that each operation is performed sequentially, but in implementation, the order may be applied differently from the illustrated examples.

Firstly, a standby state 410 is described. In the standby state 410, a plurality of voice assistants may be in standby. The examples illustrate a case in which three voice assistants are installed, but in implementation, there may be a case in which two voice assistants are installed or a case in which four voice assistants are installed.

When an event to call a voice assistant occurs in the standby state 410, the voice assistant to be used is determined. As described previously, the voice assistant to be used may be determined by determining a currently running application, user information, etc. For example, in the case of a TV viewing state 420, the first voice assistant corresponding to an application related to TV viewing may be determined as the voice assistant to be used.

As such, when an assistance function using the first voice assistant is performed, the electronic apparatus 100 may display response information by performing the processing of voice recognition regarding a user's uttered voice using the first voice assistant.

In one embodiment, when the user requests switching of the second voice assistant while an assistance function is being performed using the first voice assistant, it may become the switch state 430. For example, when the user inputs a switching command including a keyword of the second voice assistant, the electronic apparatus 100 may switch the voice assistant to be used to the second voice assistant. In this case, the switch state 430 may display a screen indicating that the voice assistant is being switched.

In one embodiment, one voice assistant is used in each of the TV viewing state 420 and the switch state 430, but a plurality of voice assistants may be used simultaneously in response to a user voice command.

Specifically, when the user does not specify the voice assistant to be used or the user's uttered command can be processed in a plurality of voice assistants, individual response information may be obtained using the plurality of voice assistants simultaneously. In addition, response information using the obtained response information can be displayed. For example, a response result of each of the plurality of assistances may be displayed on the screen together as in a response information providing state 440.

In addition, when the electronic apparatus 100 operates in a multi-view, that is, when screens of a plurality of applications are displayed simultaneously as the plurality of applications are executed, a voice assistant corresponding to each application may operate individually, and a result thereof may also be displayed individually (450).

Figure 5:
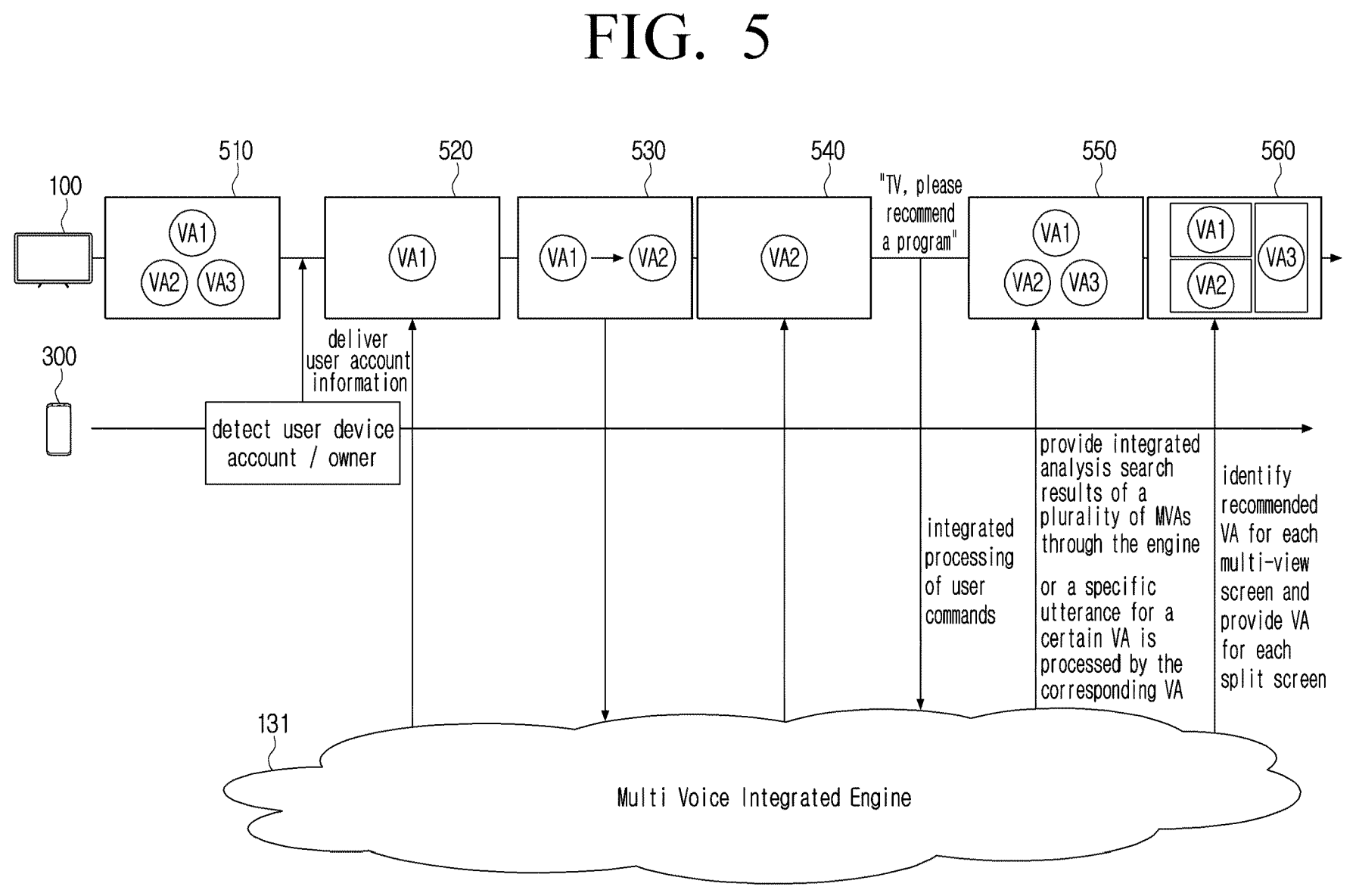

FIG. 5 illustrates an operation of an electronic apparatus according to one or more embodiments. Specifically, FIG. 5 illustrates an operation of the electronic apparatus 100 in case where an integrated engine 131 and a user voice (or a user's voice command) are received by the electronic apparatus 100 through a user terminal device 300.

In stage 510, a plurality of voice assistants (e.g., VA1, VA2, and VA3) may be installed in the electronic apparatus 100.

When user voice data is received from the user terminal device 300, the integrated engine 131 may determine the voice assistant to be used (e.g., by the electronic apparatus 100 or the integrated engine 131) based on user account information or currently running application, etc. The integrated engine 131 may perform an assistance function using the determined voice assistant (stage 520). Alternatively, the integrated engine 131 may notify the determined voice assistant to the electronic apparatus 100, thus the electronic apparatus 100 may perform an assistance function using the determined voice assistant. In stage 520, the electronic apparatus 100 may display information indicating the determined voice assistant on the screen.

In stage 530, when the user inputs a command to switch from the current voice assistant (e.g., VA1) to another voice assistant while an assistance function is being performed using the first voice assistant, the integrated engine 131 receives a request to switch from one VA (e.g., VA1) to another VA (e.g., VA2) from the electronic apparatus 100.

The integrated engine 131 may determine that the voice assistant to be used is switched from the first voice assistant (e.g., VA1) to the second voice assistant (e.g., VA2) corresponding to the user's switch command.

In stage 540, the integrated engine 131 may inform the electronic apparatus 100 of the switched voice assistant, which is the second voice assistant (e.g., VA2). The electronic apparatus 100 may display that the voice assistant has switched. In this case, a screen indicating the conversion may be displayed and the switching of the voice assistant may be output by sound. A user interface window that may be displayed in the process of switching the voice assistant as described above will be described later with reference to FIG. 6.

When a user voice command is input, the integrated engine 131 may determine the voice assistant to process the corresponding voice command by analyzing the corresponding voice command. As in the illustrated example, it may be determined that a plurality of voice assistants are used when a user voice command is a request that does not specify a specific voice assistant or when "TV" is called as a subject to perform an operation. Such an operation may be performed not only at a time of an event for calling a voice assistant function for the first time but also while an assistance function using a specific voice assistant is being executed.

For example, while an assistance function using the second voice assistant (e.g., VA2) is being executed, the integrated engine 131 may receive a voice recognition result from the second voice assistant and determine whether it is possible to perform the corresponding user request in another voice assistant based on the received voice recognition result. In this case, the integrated engine 131 may perform the above-described operation through context analysis, and may make the above-described determination based on whether a keyword (e.g., TV) indicating an integrated search is included in the corresponding voice recognition result(s).

Alternatively, when it is determined that the corresponding operation is possible only in a voice assistant other than the current voice assistant, the integrated engine 131 may cause the corresponding operation to be performed only in the voice assistant capable of performing the corresponding voice recognition result. For example, if a user's uttered request is a command to control other devices and the corresponding operation can be performed only in a voice assistant other than the currently running voice assistant, it may be determined that only the voice assistant capable of executing the corresponding command is used.

If such a determination is made, the integrated engine 131 may determine that a plurality of voice assistants are used, and as a user provides a voice message to the plurality of assistances, response information may be received from each of the plurality of voice assistants. To this end, the integrated engine 131 may store the user's voice data for a certain period of time and then, provide voice data stored in another voice assistant. Alternatively, the integrated engine 131 may provide a voice recognition result (e.g., text information or a user request for which context analysis, etc. has been completed) output from the currently operating voice assistant to another voice assistant.

In addition, the integrated engine 131 may display response information received from each of a plurality of voice assistants (stage 550). In this case, the integrated engine 131 may provide all identified response information or only common response information. Alternatively, the integrated engine 131 may provide only a plurality of response information, but may process and display common responses more distinctively than other responses. Various examples regarding a user interface window that can be displayed in the integrated response process using a plurality of voice assistants will be described later with reference to FIGS. 8 to 10.

When a plurality of multi-view screens are being provided, the integrated engine 131 may separately display response information corresponding to each multi-view screen (stage 560). For example, if the first to third applications are being executed, a response of a voice assistant corresponding to the first application may be displayed on a screen corresponding to the first application, a response of a voice assistant corresponding to the second application may be displayed on a screen corresponding to the second application, and a response of a voice assistant corresponding to the third application may be displayed on a screen corresponding to the third application. An example of a user interface window that can be displayed on a display in such a multi-view environment will be described later with reference to FIG. 7.

In the above description, various functions according to the present disclosure have been explained and hereinafter, an operation of each function will be described in greater detail with reference to FIGS. 6 to 10.

Figure 6:
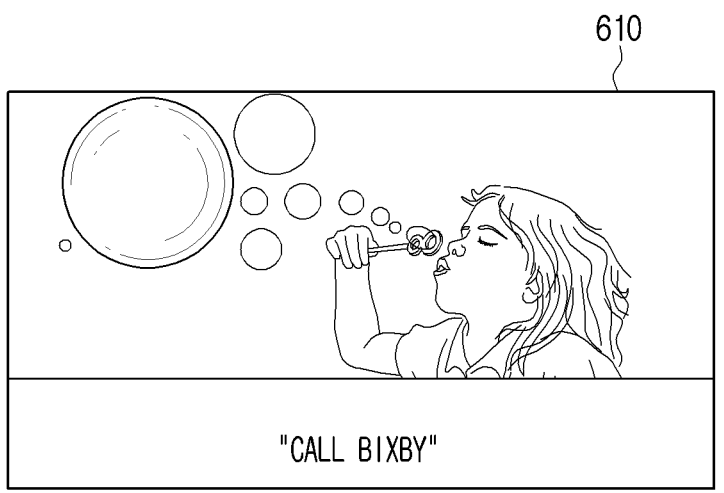
FIG. 6 illustrates an operation of switching a voice assistant according to one or more embodiments.
Figure 6:
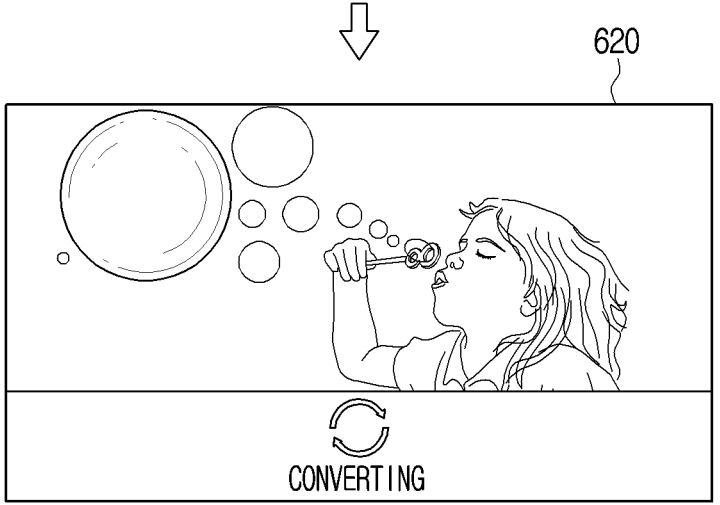
Figure 6:
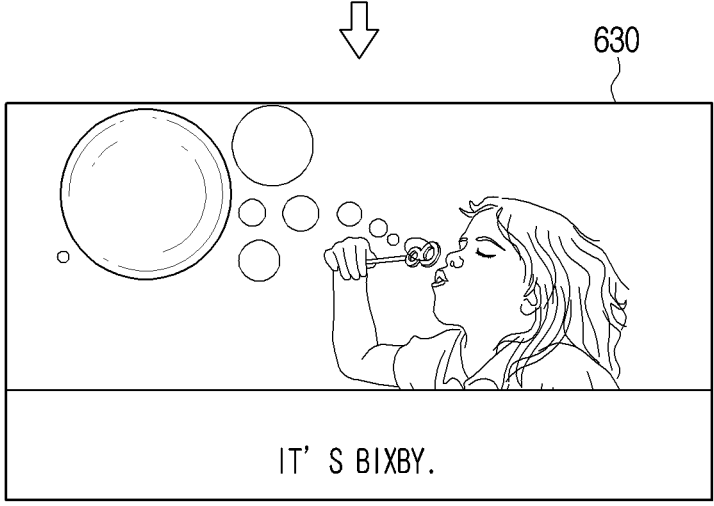

FIG. 6 illustrates an operation of switching a voice assistant according to one or more embodiments.

Referring to FIG. 6, a first screen 610 may display a content and a voice recognition result corresponding to a user voice. As such, when a user request is to switch to another voice assistant, the electronic apparatus 100 may switch the voice assistant. The illustrated example describes that the voice assistant is switched according to a user request but in implementation, the voice assistant may be switched by an event other than a user's uttered command.

For example, when a function according to a user's uttered command cannot be performed in the current voice assistant, but it can be performed in another voice assistant, switching to another voice assistant capable of performing the function according to the user's uttered command may be determined regardless of the user utterance.

In the above-described example, a user's uttered command is to control an external device, but a case in which a corresponding function cannot be performed in the current voice assistant but can be performed in another voice assistant may be an example. In addition, each voice assistant may perform a voice assistant function using an external server corresponding to each voice assistant. A case in which there is a communication failure between the first voice assistant and the corresponding first external server but there is no communication failure between the second voice assistant and the corresponding second external server may be an example.

In such a process, a second screen 620 indicating that the voice assistant is being switched may be displayed. When the voice assistant is switched, a third screen 630 indicating that the conversion is completed and it is ready to receive a user voice command may be displayed.

The illustrated example displays only an operation state of the electronic apparatus 100 but in implementation, information (or icon, thumbnail, symbol, shortcut) regarding the currently operating voice assistant may be displayed on each screen. In other words, the first screen 610 may display the first icon corresponding to the first voice assistant on one side of the screen, and the third screen 630 may display the second icon corresponding to the second voice assistant on one side of the screen. In addition, the second screen 620 may display the first icon corresponding to the first voice assistant on the left and the second icon corresponding to the second voice assistant on the right, thereby intuitively indicating that the voice assistant is being switched from the first voice assistant to the second voice assistant.

Figure 7:
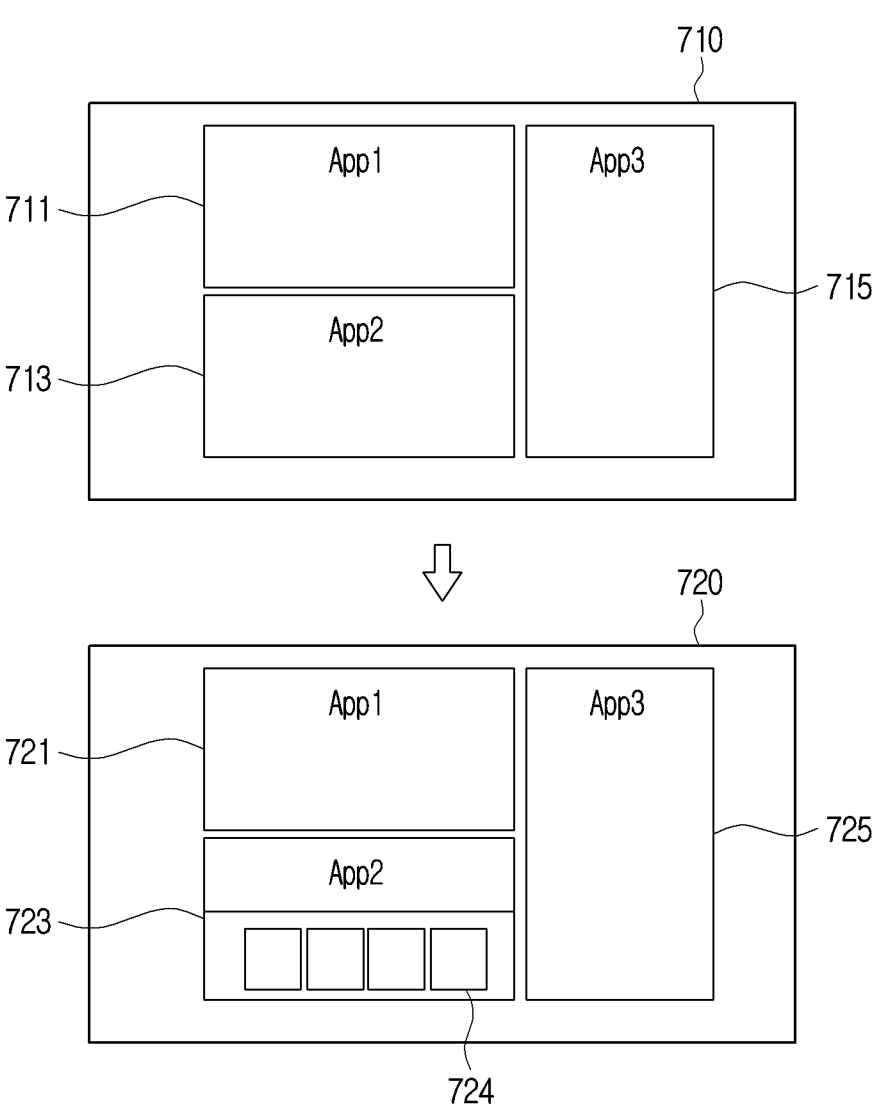
FIG. 7 illustrates an assistance function during a multi-view operation according to one or more embodiments.

FIG. 7 illustrates an assistance function during a multi-view operation according to one or more embodiments.

Referring to FIG. 7, the electronic apparatus 100 may display UIs 711, 713, 715 corresponding each of a plurality of applications on a single screen 710. In the illustrated example, a multi-view screen displaying three UIs is illustrated but in implementation, two UIs may be displayed or more than four UIs may be displayed.

In such a multi-view state, conventionally, when response information according to a user's uttered command is provided, the response information is displayed without considering the multi-view environment. In other words, in the conventional multi-view environment, it is difficult to individually control each application corresponding to each multi-view.

In order to solve the above problem, the present disclosure provides an assistance function for specifying an application corresponding to each multi-view or each screen during a process or operation of providing response information, etc.

Specifically, in a multi-view state, when a user inputs a voice command to request an operation of a specific application, the corresponding response result may be displayed only on the screen corresponding to the specific application. In addition, even when the user does not specify an application, a UI screen or application to which the current voice command is to be applied may be determined in consideration of the user's focus, history, etc.

In other words, response information 724 may be displayed only on a screen 723 corresponding to an application requested by the user from among UIs 721, 723, 725 corresponding to each of a plurality of applications as shown on a second screen 720. As such, response information is displayed only on a specific screen, and it is possible to individually control a specific application from among a plurality of running applications through a voice command.

Figure 8:
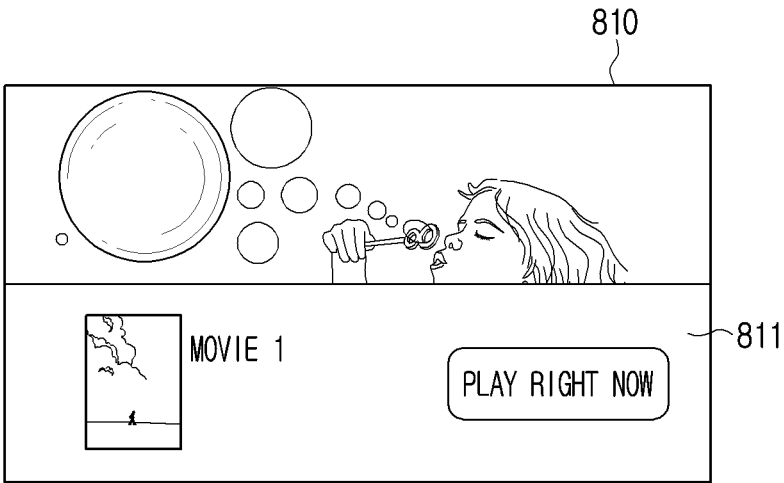
FIG. 8 illustrates an operation of an integrated voice assistant according to one or more embodiments.
Figure 9:
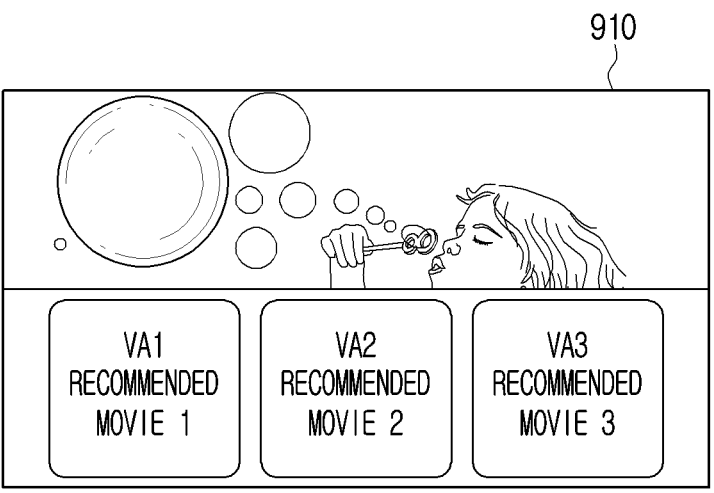
FIG. 9 illustrates an operation of an integrated voice assistant according to one or more embodiments.
Figure 10:
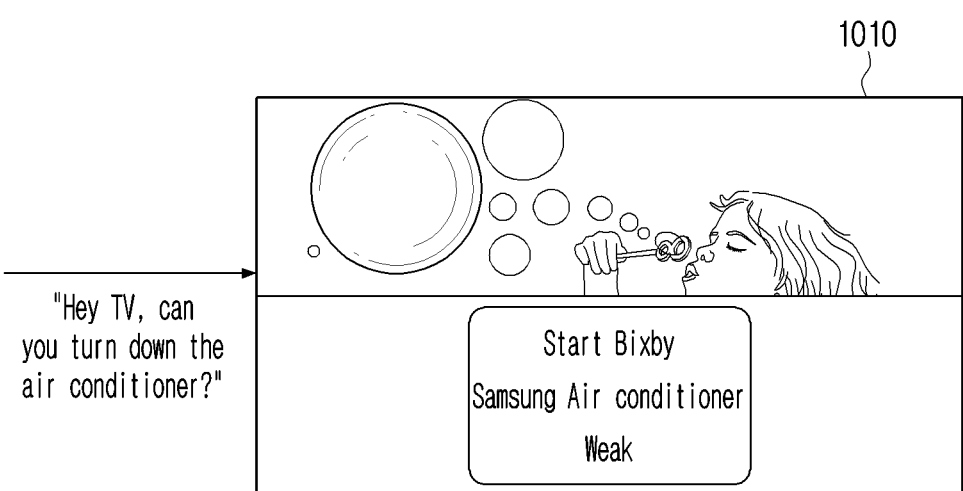
FIG. 10 illustrates an operation of an integrated voice assistant according to one or more embodiments.

FIGS. 8 to 10 are views illustrating an example of UI screen that displays an integration result according to one or more embodiments.

Specifically, FIG. 8 illustrates an example of UI screen that displays only common response information among response information generated by a plurality of voice assistants in the process of providing response information using the plurality of voice assistants.

For example, when a user inputs a voice command "Recommend a program for the user to watch", the integrated engine may obtain response information corresponding to the above-described voice command using a plurality of voice assistants. When such response information is obtained, the integrated engine may display only common response information on a screen 810 as a response result 811.

As such, an electronic apparatus according the present disclosure displays response information commonly recommended by a plurality of voice assistants, so the electronic apparatus may provide information that is more suitable for the user's intention or more accurate.

FIG. 9 illustrates a case where there is no common result or a case where a response result generated in each of a plurality of voice applications is individually output based on user setting, etc. Referring to FIG. 9, it can be seen that a screen 910 classifies and displays a response result of each voice assistant. Each response result is illustrated to include on result but in implementation, a response result of each voice assistant may include a plurality of contents (or information).

As such, an electronic apparatus according to the present disclosure displays the response results of a plurality of voice assistants at once and thus, a user can easily check desired information. In other words, in the existing environment in which only one voice assistant can be controlled, a user has to check the response information of each voice assistant one by one while individually calling the voice assistant, but according to the present disclosure, an integrated result is displayed through one operation, so it is possible for the user to check desired information more easily.

FIG. 10 illustrates a case in which only a specific voice assistant can perform a response operation according to a user request.

For example, when the user utters a command "Adjust the wind strength of the air conditioner" and only the air conditioner of the first voice assistant can be controlled, only the response information of the first voice assistant can be displayed as illustrated in FIG. 10.

As such, even though the user does not specify a specific voice assistant, the voice assistant corresponding to the user request is determined and operated and thus, the user convenience is improved.

In other words, in the prior art, the user had to determine the voice assistant capable of controlling an air conditioner and call the corresponding voice assistant. If another voice assistant is in use, the function of the corresponding voice assistant had to be terminated, and the voice assistant capable of controlling the air conditioner must be called to perform the above-described operation. However, by using the integrated engine according to the present disclosure, the user can obtain a response according to the user request without specifying a voice assistant.

Figure 11:
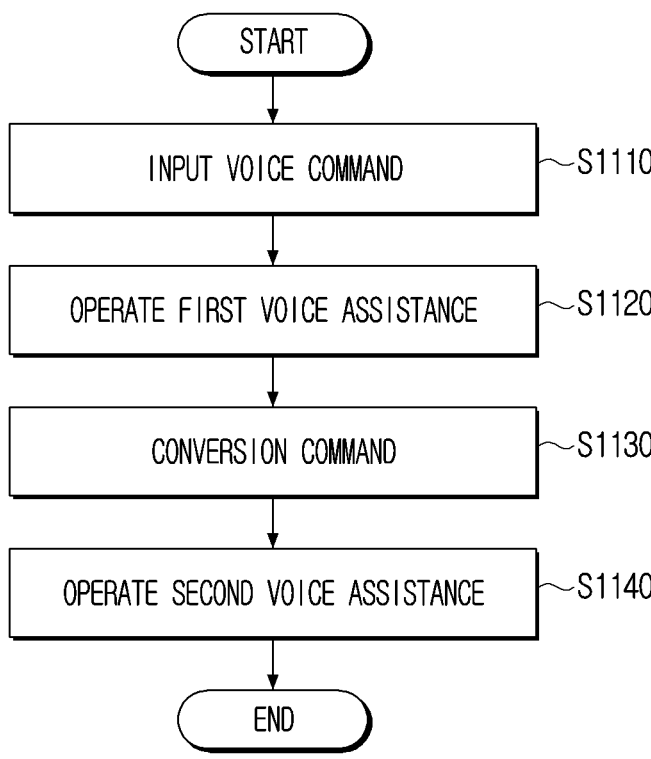
FIG. 11 illustrates a control operation of an electronic apparatus according to one or more embodiments.

FIG. 11 illustrates a control operation of an electronic apparatus according to one or more embodiments.

Referring to FIG. 11, firstly, when a user voice command is input (S1110), response information is generated by using at least one voice assistant from among different voice assistants (S1120).

In the above-described operation, the voice assistant to be used is determined in advance, but when the voice assistant to be used is not determined in advance, for example, when a voice assistant call event occurs, at least one voice assistant may be determined based on at least one of the user's uttered keyword, the user account, the currently running application, or voice assistant history information.

In this case, a plurality of voice assistants instead of one voice assistant may be determined. When a plurality of voice assistants is determined, a UI screen including response information of each of the plurality of voice assistants may be displayed. In this case, when a user voice command is input while a plurality of screens corresponding to each of the plurality of applications are displayed, response information of the voice assistant corresponding to each of the plurality of applications may be displayed on the corresponding area. Alternatively, when a plurality of voice assistants are determined, a UI screen including only common response from among response information of each of the plurality of voice assistants may be displayed.

When a predetermined voice command is input during the operation of a first voice assistant (S1130), a second voice assistant corresponding to the predetermined voice command is activated (S1140). Specifically, when a voice command is input, the user voice command is identified using the first voice assistant, when the identified user voice command is a command to activate or invoke the second voice assistant, the second voice assistant is activated, and when the second voice assistant is activated, the input voice command may be processed using the second voice assistant. In this case, when the identified user voice command is a command to activate or invoke the first voice assistant, a UI screen informing that the voice assistant is changed may be displayed.

Alternatively, when a voice command is input, the user voice command is identified using the first voice assistant, and when the identified user voice command is a voice command that can be processed in another second voice assistant, the second voice assistant may also be activated and response information may be generated using each of the first voice assistant and the second voice assistant.

As described above, a controlling method in an electronic apparatus according to the present disclosure integrates and manages (or processes) a plurality of voice assistants and thus, it is possible for the user to easily select/convert the voice assistant and to receive more diverse or accurate information through a single voice command.

Figure 12:
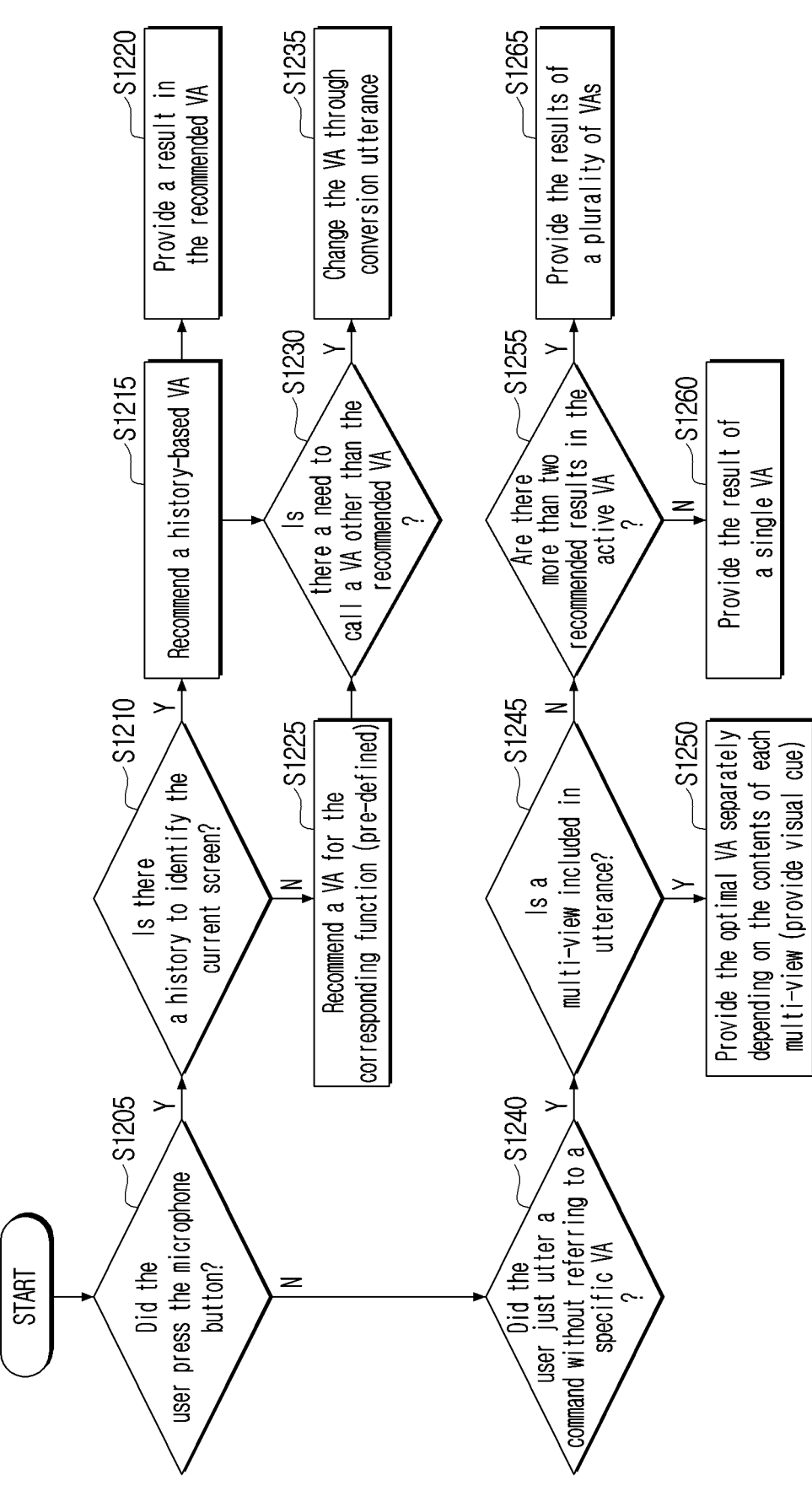
FIG. 12 illustrates an operation of an integrated voice assistant according to one or more embodiments.

FIG. 12 illustrates an operation of an integrated voice assistant according to one or more embodiments.

Referring to FIG. 12, it is identified whether a voice assistant call event occurs. Specifically, such a voice assistant call event may occur when the user presses or selects a microphone button provided on an electronic apparatus, a remote controller or a user terminal device (S1205) or when the user utters a certain keyword (a trigger command) (S1240).

In case where the user presses a microphone button (S1205-Y), it may be identified whether there is a history for grasping the context of the current screen (S1210). Here, the history information may include a TV watching history, whether a specific application has been performed, whether it is a search process, whether the focus is on a specific application, and the like.

When there is such history information (S1210-Y), the voice assistant to be used may be determined based on the history information (S1215). Also, an assistance function using the determined voice assistant may be performed (S1220).

When there is no such history information (S1210-N), the voice assistant to be used may be determined by using a pre-stored algorithm in addition to the above-described history information (S1225). Also, an assistance function using the determined voice assistant may be performed.

In one embodiment, when the user inputs a command to switch to another voice assistant while using the first voice assistant (S1230), the voice assistant may be switched and the conversion process may be displayed (S1235).

When the conversion is completed, an assistance function may be performed using the converted voice assistant.

If the user does not press the microphone button, it may be identified whether a specific keyword is included in the user's uttered voice (S1240). For example, when a keyword calling an integrated engine (e.g., "Hey, TV", etc.) or a keyword corresponding to a specific voice assistant (e.g., "Hi Bixby", etc.) is included, it may be determined that a voice assistant function is called.

When such a voice assistant function is called, it is determined whether the electronic apparatus 100 is operating in a multi-view (S1245).

When the electronic apparatus 100 is operating in a multi-view, a voice assistant function may be performed and the result may be displayed according to the content of each multi-view (S1250).

When the electronic apparatus 100 is not operating in a multi-view, the voice assistant to perform a voice assistant function is determined. When there is one determined voice assistant, a voice assistant function may be performed using the corresponding voice assistant (S1260).

When it is determined that a plurality of voice assistants are used, an assistance function may be performed using the plurality of voice assistants and it may be provided to the user through the response result of each voice assistant (S1260).

The methods according to one or more embodiments of the disclosure described above may be implemented in the form of an application that can be installed in the existing electronic apparatus.

In addition, the methods according to one or more embodiments of the disclosure described above may be implemented only by software upgrade or hardware upgrade for the existing electronic apparatus.

In addition, the methods according to one or more embodiments of the disclosure described above may be performed through an embedded server provided in the electronic apparatus or an external server of at least one of the electronic apparatuses.

According to one or more embodiments of the disclosure, the embodiments described above may be implemented by software including an instruction stored in a storage medium readable by a machine (e.g., a computer). The machine may be an apparatus that invokes the stored instruction from the storage medium and may be operated based on the invoked instruction, and may include an electronic apparatus (e.g., electronic apparatus A) according to the disclosed embodiments. In case that the instruction is executed by the processor, the processor may directly perform a function corresponding to the instruction or other components may perform the function corresponding to the instruction under control of the processor. The instruction may include codes provided or executed by a compiler or an interpreter. The machine-readable storage medium may be provided in the form of a non-transitory storage medium. Here, the term 'non-transitory' indicates that the storage medium is tangible without including a signal (e.g., electromagnetic waves), and does not distinguish whether data are semi-permanently or temporarily stored in the storage medium. For example, 'non-transitory storage medium' may include a buffer in which data is stored temporarily.

According to one or more embodiments, the methods may be included and provided in a computer program product. The computer program product may be traded as a product between a seller and a purchaser. The computer program product may be distributed in the form of a storage medium (e.g., compact disc read only memory (CD-ROM)) that is readable by devices, may be distributed through an application store (e.g., Play Store™) or directly between two user devices (e.g., smartphones), or may be distributed online (e.g., by downloading or uploading). In the case of an online distribution, at least part of the computer program product (e.g., a downloadable application) may be at least temporarily stored in a storage medium readable by a machine such as a server of the manufacturer, a server of an application store, or the memory of a relay server or may be temporarily generated.

The one or more embodiments of the present disclosure may be implemented by software including an instruction stored in a storage medium readable by a machine (e.g., a computer). The machine may be an apparatus that invokes the stored instruction from the storage medium and may be operated based on the invoked instruction, and may include an electronic apparatus (e.g., electronic apparatus A) according to the disclosed embodiments.

In case that the above-described instruction is executed by the processor, the processor may directly perform a function corresponding to the instruction or other components may perform the function corresponding to the instruction under control of the processor. The instruction may include codes provided or executed by a compiler or an interpreter.

In the above, preferred embodiments have been illustrated and described, but the disclosure is not limited to the specific embodiments described above, and those of ordinary skill in the art pertaining to the disclosure may modify the embodiments without departing from the gist of the claims and these modifications should not be individually understood from the technical spirit or perspective of the disclosure.

What is claimed is:

1. An electronic apparatus comprising:
a display;
a memory configured to store a plurality of assistance instructions respectively corresponding to a plurality of voice assistants; and
at least one processor operatively connected to the display and the memory,
wherein the at least one processor is configured to:
based on a user voice command being received, generate response information by using at least one voice assistant and control the display to display the generated response information,
based on a predetermined voice command being received while a function corresponding to a first voice assistant is performed, activate a function corresponding to a second voice assistant according to the predetermined voice command,
wherein the at least one processor is further configured to:
based on the user voice command being associated with activating the function corresponding to the second voice assistant identified by the first voice assistant, activate the function corresponding to the second voice assistant, and
process the user voice command by using the function corresponding to the second voice assistant.

2. The electronic apparatus of claim 1, wherein the at least one processor is further configured to, based on a checked user voice command, control the display to display a user interface (UI) screen informing that a voice assistant is changed from the first voice assistant to the second voice assistant.

3. The electronic apparatus of claim 1, wherein the at least one processor is further configured to:
check the user voice command by using the first voice assistant,
based on the checked user voice command that is processed by the second voice assistant, activate the second voice assistant, and
generate response information by using at least one of the first voice assistant or the second voice assistant.

4. The electronic apparatus of claim 1, wherein the at least one processor is further configured to:
based on a voice assistant call event, determine at least one voice assistant based on at least one of a user utterance keyword, a user account, a currently running application, or voice assistant history information, and activate the determined at least one voice assistant.

5. The electronic apparatus of claim 1, wherein the at least one processor is further configured to, based on a voice assistant call event, activate the plurality of voice assistants and process a user voice command by using each of the plurality of voice assistants.

6. The electronic apparatus of claim 5, where the at least one processor is further configured to control the display to display a user interface (UI) comprising response information of the each of the plurality of voice assistants.

7. The electronic apparatus of claim 6, wherein the at least one processor is further configured to:
based on a user voice command being input while a plurality of sub-areas of the display displays a plurality of applications, control the display to display response information corresponding to each of the plurality of applications respectively on the plurality of sub-areas.

8. The electronic apparatus of claim 5, wherein the at least one processor is further configured to control the display to display a user interface (UI) screen comprising common information in response information for the plurality of voice assistants.

9. The electronic apparatus of claim 1, further comprising a communication device configured to receive voice data comprising a user voice,
wherein the at least one processor is further configured to, based on voice assistant identification information being received together with the voice data from the communication device, generate response information by using a voice assistant corresponding to the voice assistant identification information.

10. The electronic apparatus of claim 1, further comprising:
a communication device configured to receive 1) voice data comprising a user voice and 2) user information,
wherein the at least one processor is further configured to, based on the received user information, generate response information by using a voice assistant corresponding to the received user information.

11. A controlling method of an electronic apparatus, comprising:
receiving a user voice command from a user;
based on the user voice command being received, generating response information by using at least one voice assistant of a plurality of voice assistants;
displaying the generated response information;
based on a predetermined voice command being received while a function corresponding to a first voice assistant is performed, activating a function corresponding to a second voice assistant according to the predetermined voice command; and
wherein activating the function corresponding to a second voice assistant according to the predetermined voice command comprises:
based on the user voice command being associated with activating the function corresponding to the second voice assistant identified by the first voice assistant, activating the function corresponding to the second voice assistant, and
processing the user voice command by using the function corresponding to the second voice assistant.

12. The controlling method of claim 11, wherein the activating the function corresponding to the second voice assistant comprises:
checking the user voice command by using the first voice assistant, based on the checked user voice command that is processed by another second voice assistant, activating the second voice assistant, and generating response information by using at least one of the first voice assistant or the second voice assistant.

13. The controlling method of claim 11, further comprising:

based on a voice assistant call event, determining at least one voice assistant based on at least one of a user utterance keyword, a user account, a currently running application, or voice assistant history information, and activating the determined at least one voice assistant.

14. A method performed by an integration engine communicating with a display device having a plurality of voice assistants, comprising:

transferring, to the display device, a first command to activate a first voice assistant of the plurality of voice assistants;

receiving, from the display device, a first request to determine a new voice assistant to be used by the display device;

determining the new voice assistant to be used by the display device; and transferring, to the display device, a second command to inform the determined new voice assistant, wherein the determining the new voice assistant to be used by the display device comprises determining the new voice assistant to be used by the display device based on a pattern of using the plurality of voice assistants by a user of the display device.

15. The method of claim 14, further comprising:

receiving a second request to perform an integrated process of a user's voice command in the plurality of voice assistants; and transmitting, to the display device, a result of the integrated process of the user's voice command in the plurality of voice assistants.

16. The electronic apparatus of claim 1, wherein the at least one processor is further configured to:

based on a voice command, check a user voice command by using a first voice assistant, based on the checked user voice command, activate a second voice assistant, and based on the activated second voice assistant, process the voice command by using the second voice assistant.

17. The controlling method of claim 11, wherein the activating a second voice assistant operation corresponding to the predetermined voice command comprises:

based on a voice command, checking a user voice command by using a first voice assistant, based on the checked user voice command to activate the second voice assistant, activating the second voice assistant, and based on the activated second voice assistant, processing the voice command by using the second voice assistant.

* * * * *